United States Patent [19]

Midkiff et al.

[11] Patent Number: 5,730,164
[45] Date of Patent: Mar. 24, 1998

[54] VEHICLE TIRE AND TRACK WASHING APPARATUS

[75] Inventors: David G. Midkiff, Fairfax; Antonio B. Caggiano, Springfield, both of Va.

[73] Assignee: Americlean of Virginia, Ltd., Fairfax, Va.

[21] Appl. No.: 551,729

[22] Filed: Nov. 1, 1995

[51] Int. Cl.$^6$ ........................................ B08B 3/02
[52] U.S. Cl. ........................... 134/104.2; 134/123
[58] Field of Search ................ 134/45, 123, 104.2; 15/DIG. 2; 137/234.6

[56] References Cited

U.S. PATENT DOCUMENTS

| | | | |
|---|---|---|---|
| 4,917,125 | 4/1990 | Midkiff | 134/123 |
| 4,979,536 | 12/1990 | Midkiff | 134/123 |
| 5,261,433 | 11/1993 | Smith | 134/123 |
| 5,597,001 | 1/1997 | Rasmussen et al. | 123/104.2 |

FOREIGN PATENT DOCUMENTS

| | | | |
|---|---|---|---|
| 217147 | 10/1972 | Germany | 134/123 |
| 2828334 | 1/1980 | Germany . | |
| 57-74252 | 5/1982 | Japan | 134/123 |
| 58-30853 | 2/1983 | Japan . | |

*Primary Examiner*—Frankie L. Stinson
*Attorney, Agent, or Firm*—Watson Cole Stevens Davis, P.L.L.C.

[57] ABSTRACT

A vehicle tire and track washing apparatus including an elongated trough with side walls and a bottom, and grates for supporting vehicles in the trough, in which the grates are supported by feet mounted at their outwardly extending edges substantially horizontal to the bottom. When the grates have been pivoted upwardly, the trough is free of impediment to the removal of debris washed from the vehicles tires or tracks.

11 Claims, 4 Drawing Sheets

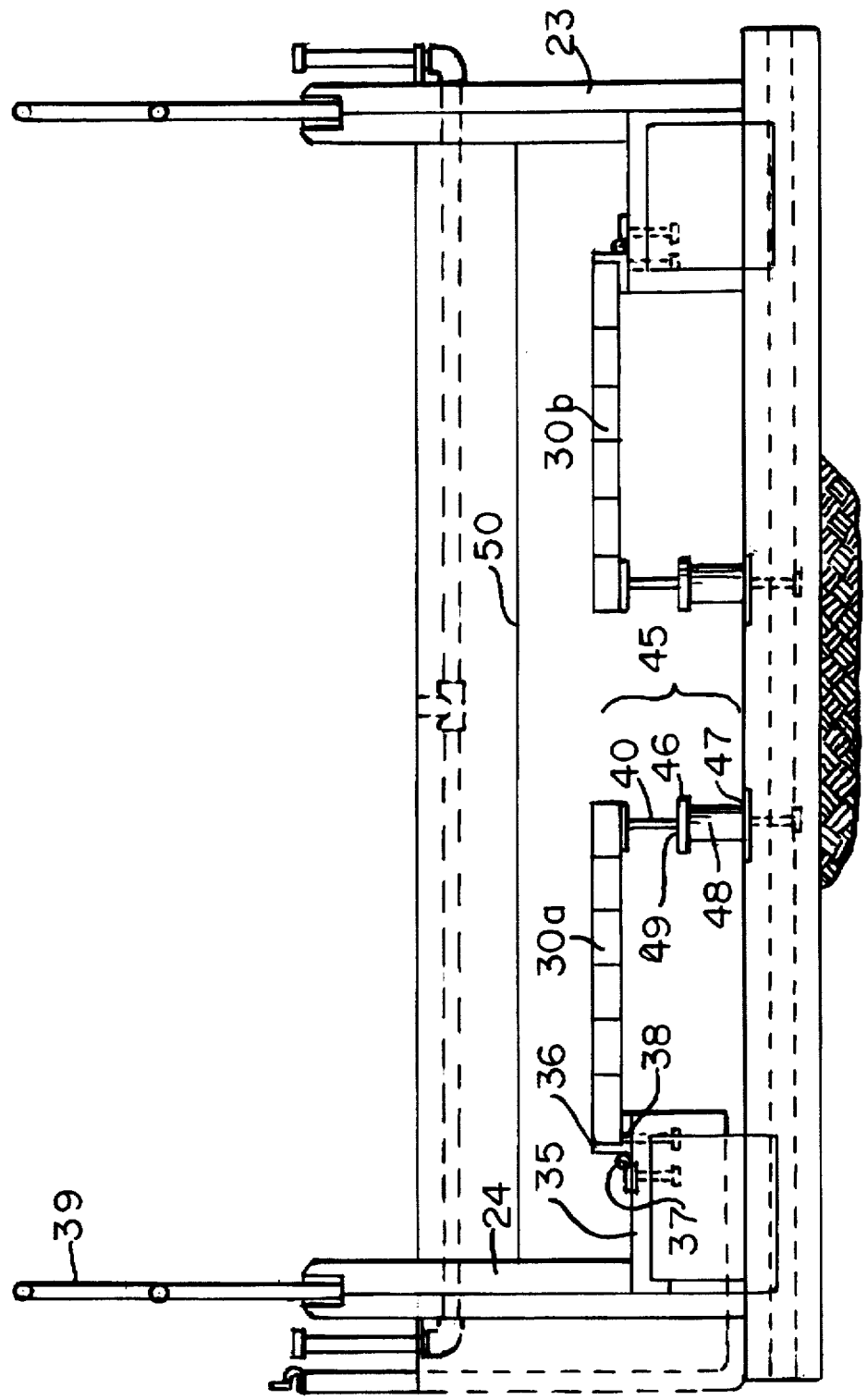

VEHICLE TIRE AND TRACK WASHING APPARATUS

BACKGROUND OF THE INVENTION

1. Field of the Invention

The present invention relates generally to apparatus for washing vehicle tires and wheels on which those tires are mounted. More particularly, it relates to apparatus for removing mud and dirt from the tires and tracks of vehicles.

2. Description of the Prior Art

The apparatus described in the present application represents an improvement over that disclosed in prior U.S. Pat. No. 4,917,125, which issued on Apr. 17, 1990. As described in that patent, all parts of which are incorporated by reference herein where requisite, it is known that when a vehicle leaves a construction or other site to which it has been driven, for example, with a load of gravel or building supplies, the vehicle will have to leave a paved road in order to deliver its cargo. In reaching its discharge site, it will be driven over unpaved terrain where it will ride over soil the water content of which will depend upon the last rain at the construction site.

Not only is it important from an aesthetic point of view that the vehicle not leave the construction site with its tires embedded with soil, gravel, or other materials that have become at least temporarily held at the wheels and the side walls and treads of the tires, but many jurisdictions now require contractors to remove such mud and dirt from the pavement after the vehicle has deposit such debris on a paved surface. Moreover, debris on the paved surface of the road represents a hazard to other vehicles that pass along the road, usually at a far greater speed than the truck. As a result, it may become expensively incumbent on the contractor to sweep, wash or otherwise remove the debris deposited by his trucks from the paved surface. While this can be accomplished to some extent on paved surfaces adjacent to the construction site, where such debris, such as moist soil, only dries out after the truck has moved a considerable distance from the site and, upon drying is deposited from the tires on the paved surface, it will be impossible for the contractor to locate debris so deposited and remove it from the roadway surface.

As a consequence, the art has long recognized that it is highly advantageous to remove soil and debris from vehicle tires and wheels as those vehicles leave the construction site, whereupon they will enter a paved road surface adjoining the site substantially free of unwanted material that might otherwise have been deposited on that surface. The objects set forth in my U.S. Pat. No. 4,917,125 are incorporated herein. However, those objects are accomplished in a far more expeditious and economic manner than that accomplished by the apparatus of my prior patent, which is incorporated by reference herein insofar as its structure and function are similar to those of the present invention.

SUMMARY OF THE INVENTION

In one form, the present invention comprises an in-ground vehicle tire and wheel washing apparatus that has an elongated trough, which may be disposed in a ground pit. The trough has a bottom and side walls that are spaced about from each other. It terminates at one end in an inclined vehicle entrance ramp and at the other end in an inclined vehicle exit ramp, and each of the ramps terminate outwardly substantially at ground level so that a vehicle whose wheels and tires are to be washed enters the trough through the entrance ramp and exits at the exit ramp.

While in the trough, the vehicle is positioned on an open-mesh grate that at one end is connected to pivot means mounted on a bearing surface of a side wall. The grate terminates outwardly in support means to enable it to contact the trough bottom, such that when the grate is in horizontal position overlying the trough bottom, it will be supported at one end by the pivot means at the side wall bearing surface and at its outwardly end by the trough bottom. Further, the grate is movable between that horizontal position and a raised position, and when the grate is pivoted upwardly so that it does not overlie the trough bottom, that bottom is substantially free of obstructions from trough structure. With the grate pivoted upwardly, accumulated debris in the trough from vehicles can be removed from the trough bottom, either toward the trough entrance or exit, without interference from trough structure extending longitudinally or transversely of the trough or otherwise impeding the removal of such debris.

In a preferred mode of my invention, it is particularly specified that opposed grates extend from locations where they are pivotally attached to bearing surfaces at each of the inwardly facing surfaces of the side walls of the trough. The grates can be extended toward each other where they terminate in support means to contact the bottom of the trough and in such extended position lie in substantially the same, horizontal plane. The grates can be pivoted so that they move upwardly away from each other and toward the trough side walls, and in such upwardly pivoted positions, debris from vehicle tires or tracks can again be removed from the bottom of the trough where it has accumulated toward either the entrance or exit end of the trough for expeditious removal.

When opposed or single grates are utilized, the means for supporting a grate includes, as stated, support means. Such means may be in the form of feet fixed to the outwardly extending end of the grate such that the feet will rest on the bottom of the trough and, according to the height of the feet, the grates supported by them will be maintained in a substantially horizontal position. Opposed and adjoining grates will lie in the same horizontal plane, and can be adjusted so that their ends are either closely adjacent to each other to form an almost continuous surface, or are separated from each other.

The feet that support the grates are preferably fixed to one grate at one corner of the grate end along the bottom surface thereof. Most preferably, there is one foot per grate, and that foot extends beyond the periphery of the grate to which it is fixed in the direction of the next adjoining grate. In this manner a single foot supports the grate to which it is fixed and one end of the next adjacent grate, which it underlies, without being attached to that next adjacent grate. In this manner as a row of grates is hingeably moved from horizontal to substantially vertical position, only a single foot per grate need be raised, since each foot supports the outwardly extending corners of two grates.

These and other objects, features, and advantages of my invention will become more readily apparent from the detailed description of preferred embodiments of my invention, which description is made in conjunction with drawings in which:

BRIEF DESCRIPTION OF DRAWINGS

FIG. 4 is a cross-sectional view taken along line 4—4 of FIG. 2;

FIG. 5 is an enlarged side elevational view showing two grates and a supporting foot.

DETAILED DESCRIPTION OF PREFERRED EMBODIMENTS

Figure 1:
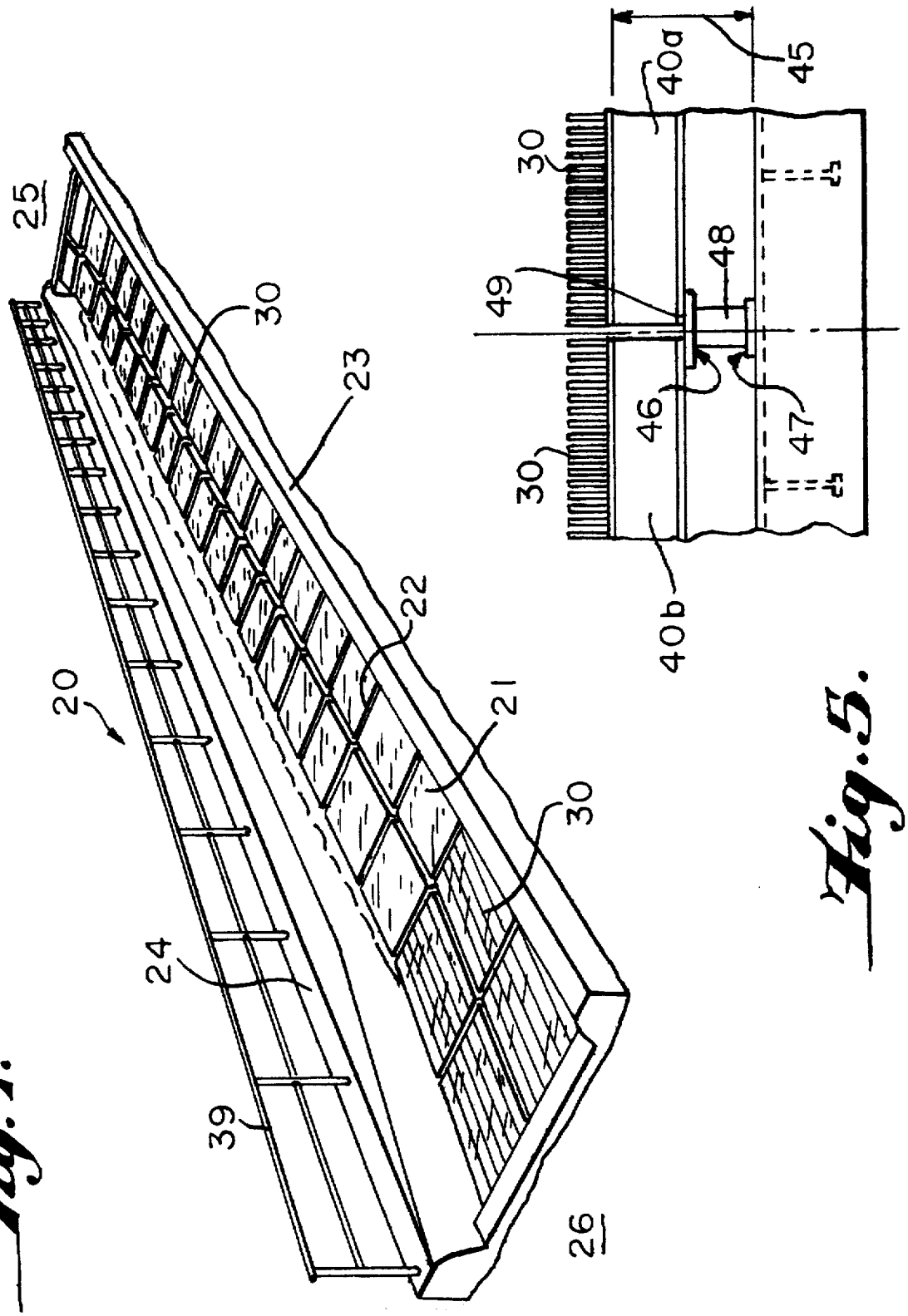
FIG. 1 is a perspective view of a preferred embodiment, showing the general layout of my vehicle tire and track washing apparatus.

Referring now to the drawings, and more particularly to the perspective view illustrated in FIG. 1, the vehicle tire and track washing apparatus indicated generally by reference numeral 20 consists of a trough 21 formed with a bottom 22 and opposed side walls 23 and 24. As shown in FIG. 1, there is an entrance ramp indicated generally at 25 and an exit ramp similarly indicated at 26. A plurality of open-mesh grates are mounted over the length of the trough above the trough bottom and part of the ramps; those grates are designated by reference numeral 30. In several figures of the drawings, most notably FIGS. 1 and 2, while only one or more of the grates have been so-indicated in detail, it will be apparent that, in the preferred embodiment, it is desired that grates extend the entire length of the trough and part of the ramps since those grates perform an important function in effecting washing of vehicle tires and tracks.

Figure 2:
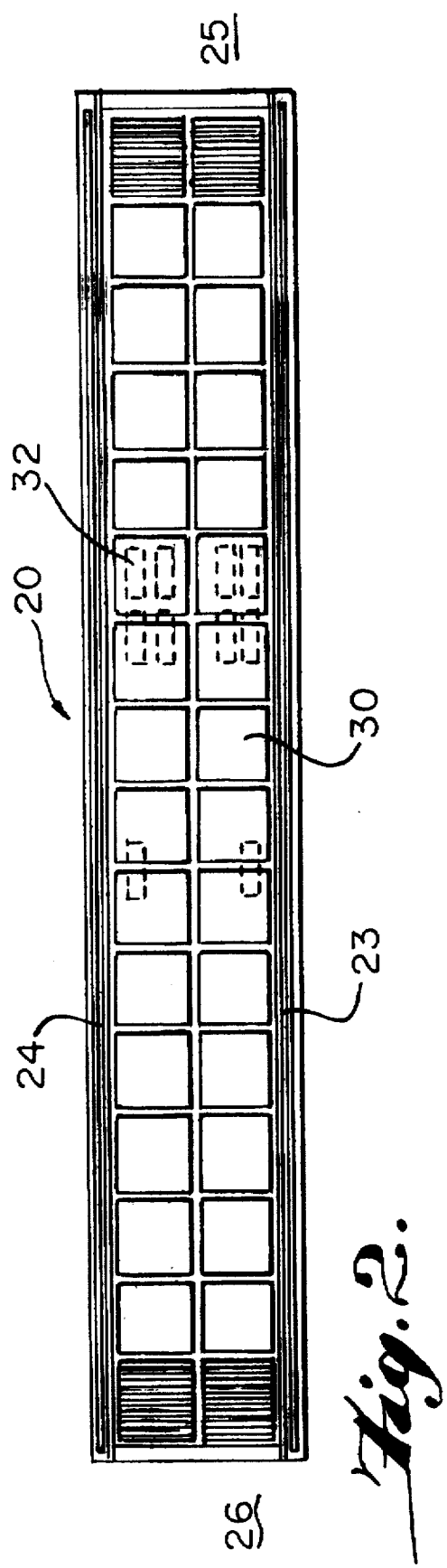
FIG. 2 is a plan view of the embodiment of FIG. 1.
Figure 3:
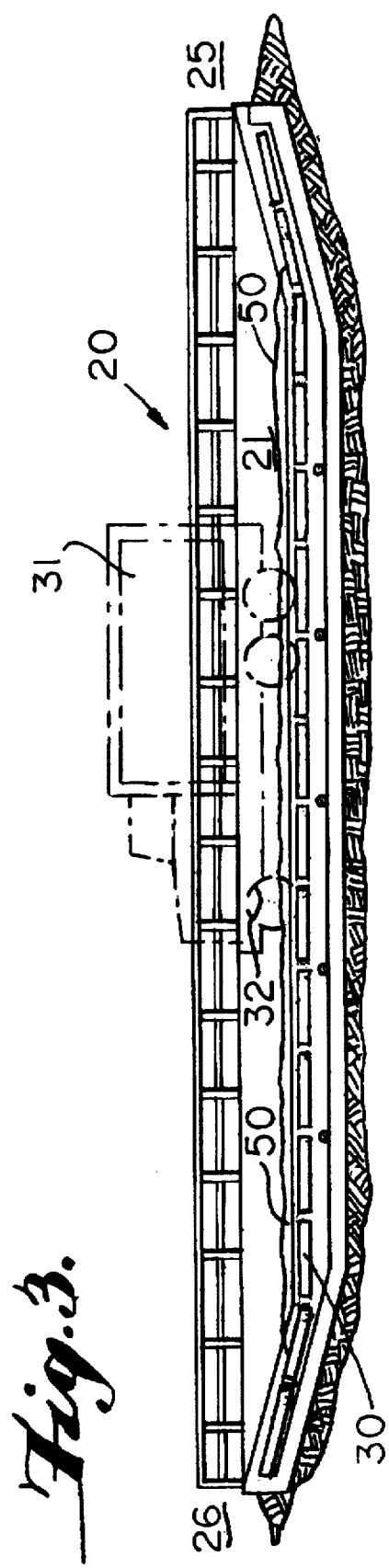
FIG. 3 is a cross-sectional view taken along line 3—3 of FIG. 2.

The use of my apparatus 20 for its washing function is also seen in FIGS. 2 and 3. In FIG. 3 a truck 31 is shown in position over the trough 21. The truck has tires 32 which are positioned on grates 30 as the truck moves from entrance ramp 25 to exit ramp 26 of the trough 21. Thus, the grates 30 support the entirety of the weight of the truck as it moves through the trough. A track vehicle would utilize the apparatus 20 in the same manner.

The structure of my present invention and, in particular, that portion of the structure which shows how my present invention differs from that of U.S. Pat. No. 4,917,125 is perhaps best seen in FIG. 4. As there shown, it will be seen that there are two grates which have the same structure and function and will be designated as grates 30a and 30b. Grates 30a are connected to the side wall 24, which wall has been formed, usually of concrete, with a substantially horizontal surface 35. Mounted on the horizontal surface 35 is a hinge 38, which may be of conventional structure, formed by a bracket 36 and a pin 37. Because bracket 36 is firmly fixed to the grate 30a, rotary movement of the grate 30a in a counterclockwise direction will cause pin 37 to rotate with the bracket 36, thereby defining the limits of motion of which grate 30a is capable. As fully rotated, grate 30a will be in the position best shown in FIG. 6 in which, as a matter of safety, a railing 39 (FIGS. 1 and 4) is utilized to anchor the elevated grate 30a. The other side wall 23 of the trough 21 will not be specifically described because the structure is a mere duplicate.

An important part of the present invention lies in the means whereby a grate 30a or 30b is supported on the bottom 22 of the trough 21 in substantially horizontal position as shown in FIG. 4 in solid lines and in FIGS. 1, 2 and 3. In such position an I-beam support 40 is fixed to the lower surface of the free end of the grate 30a. In FIGS. 4 and 5, the latter of which is a fragmentary view, one embodiment of that foot or support means 40 is shown. In such embodiment the foot is formed from an upper wall 46 and a lower wall 47 joined by a shaft 48. Upper wall 46 is fixed to lower leg 49 of I-beam 40, that itself is joined to the outwardly extending edge of the grate 30. It will be apparent that the foot forms a pedestal on which grate 30 rests and which at the pedestal lower wall 47 contacts the bottom 22. As the trough bottom is substantially planar, the foot form a firm contact with the lower wall 47.

As best shown in FIG. 5 lower plate 49 of I-beam 40a is fixed to upper wall 46 of pedestal 45. Yet the upper wall 46 is free of I-beam 40b and its grate 30. As a consequence, although a pedestal 45 supports two adjoining grates at their closest corners, it is attached only to one of the i-beams that support the grates. This structure is repeated from grate to grate as they extend along the length of the trough. At the last grate of the row, an additional support for the free end will have to be provided.

Figure 6:
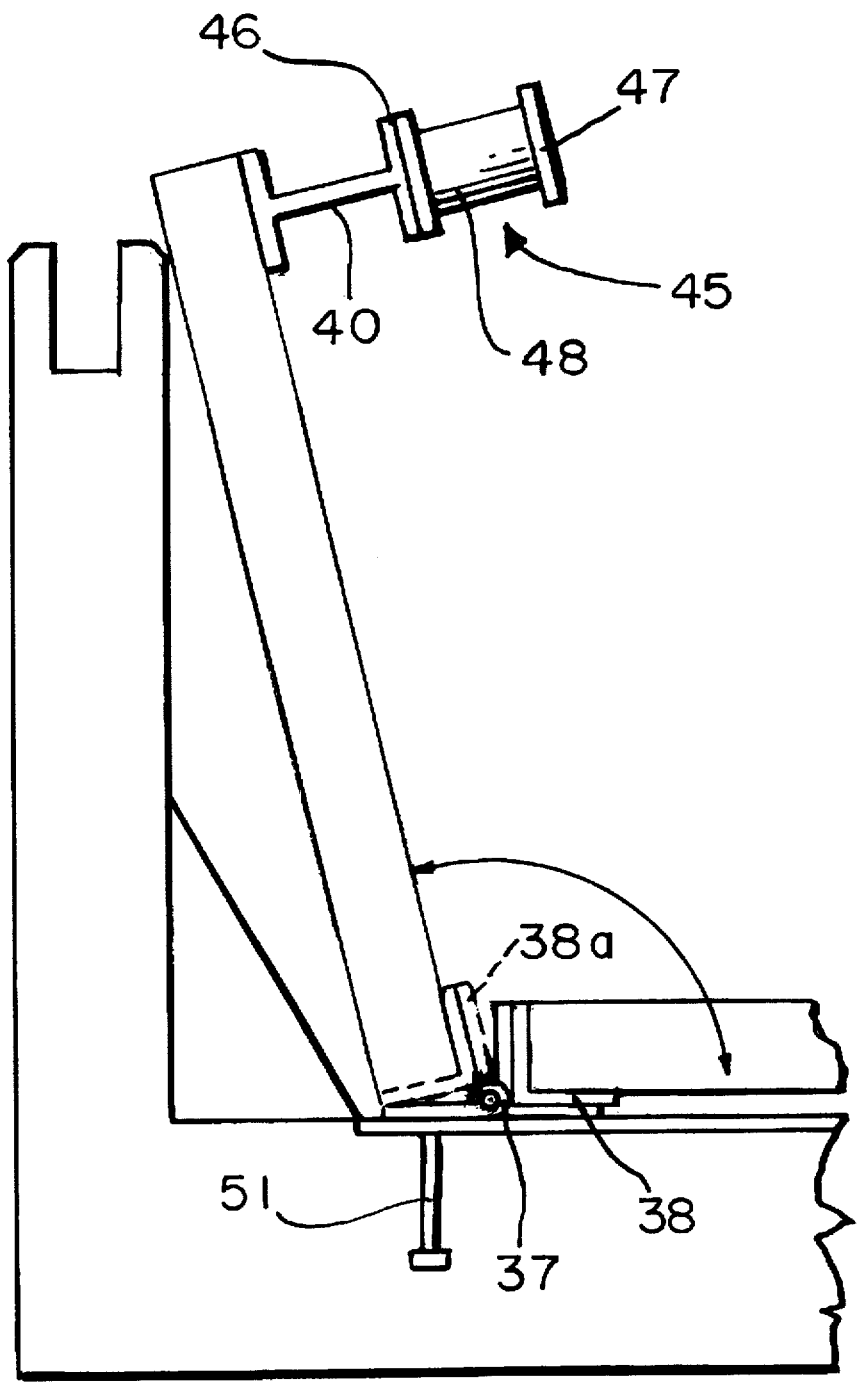
FIG. 6 is a side elevational view of a grate in raised position.

A view of a portion of the invention is illustrated in FIG. 6 with the grate 30 in raised, non-operative position. There seen in side elevation are the I-beam 40 attached to the underside of the grate and the pedestal or foot 45 formed plates 46 and 47 joined by cylinder 48. Also seen in FIG. 6 is hinge bracket 38, which pivot about pin 37 to the position 38a, under the control of anchor bolt 51.

A prime advantage of the present structure over that previously described in U.S. Pat. No. 4,917,125 is that there is no fixed central post, concrete or otherwise, that acts as a support for the grates as they pivot about the bearing surfaces 35. Because there is no concrete stanchion running lengthwise along the bottom of the trough, the capacity of the trough is substantially increased, while actually reducing the cost of the trough because it is not necessary to employ a concrete stanchion. Because the fluid holding capacity of the trough has been increased, liquid for cleaning tires and/or tracks can be used in the space formally occupied by the concrete stanchion and, with its increased capacity, the trough need not be cleaned at as frequent intervals as when the concrete stanchion was utilized.

Further, it has been found that the maintenance cost of using the trough are substantially reduced. Trough width is a definite factor, because the trough must be wide enough to accommodate a vehicle, yet need be only wide enough as to accommodate the widest vehicle that will be utilized. It will be necessary periodically to clean, i.e., remove accumulated debris from the body of the trough, such debris, including mud, etc., having passed through the grates and settled at the bottom of the trough. With a concrete stanchion, the prior art trough of my invention was in effect two separate troughs, and since the width of each separate section was less than three feet, removal of mud and debris had to be accomplished by hand. However, with the concrete stanchion removed but the grates equally effective, the trough now has a usable width of more than seven feet. This supplies greater washing fluid capacity, but, more important, a backhoe or similar equipment can now enter the trough with the grates pivoted out of the way or otherwise removed, and mud and debris extracted from the bottom of the trough because, without the concrete stanchion, the trough is wide enough so that there is no difficulty accommodating the conventional power lift of a backhoe or other cleaning equipment.

Still another advantage of the present invention as compared with that of U.S. Pat. No. 4,917,125 is that it permits use of mobile troughs rather than those of concrete. Thus the side walls and bottom of the present trough can be formed of steel rather than concrete. When the construction or other facility has been completed or is no longer to be used, the vehicle tire and track washing apparatus can be disassembled and moved to another site. This was not possible when a centrally located concrete platform was used to support the free ends of the grates, since that platform had to be destroyed after use. Indeed, the present invention can be used as a rental vehicle, since on building construction sites there will be no need for the apparatus once the construction has been completed.

Also, it permits the use of grates that need not extend a lesser distance toward the center trough. With the use of a concrete stanchion, it was necessary for the grates to have a width (the dimension extending toward the center of the trough) sufficient to contact the supporting stanchion. The wider the grate, the greater the unsupported area subject to the load of a heavy truck, and so the more expensive and structurally stable the grate must be. Without the need for a stanchion, the grates can have significantly lesser widths and rather than having the grate ends juxtaposed, opposed ends can be spaced from each other by one-fourth or more of the width of the trough to create a substantial longitudinal space along the longitudinal center of the trough, which is, of course, dimensioned so that the washed vehicle cannot enter that space or fall through the gap between the grates.

Still further, by not having a central, concrete barrier the removal of sediment from the bottom of the trough by drain pipes can be greatly facilitated. There is no need to provide pipes, such as those identified by reference numeral 260 in U.S. Pat. No. 4,917,125, which permit water and sediment to flow through the concrete central dividing member 230 to the drain pipe there identified by numeral 254.

In operation, my improved trough is utilized to remove mud and debris from the tires and tracks of vehicles in much the same manner as that of my former invention. A truck 31, (FIG. 3) is driven carefully down entrance ramp 25 and onto grates 30 which are held by grate feet 40 above the trough bottom 21 of apparatus 20. In such position, where the trough has already been filled to an appropriate water level, that indicated by reference numeral 50, in FIGS. 3 and 4, above the grates 30 and at the height of the tire annulus, when a truck passes over the grates, the spaces in the mesh causes a slight vibration and flexing of the truck tires, thereby facilitating removal of soil adhered to the tires. The motion of the truck through the trough on the grates causes a tidal effect which aids in the washing action of the tires.

As the truck moves through the trough, soil and debris separated from the tires falls through the grates, and as soil bearing water is heavier, it gravitates to the bottom of the trough where it can be removed by conventional drain pipes. However, when the accumulated mud and debris is such that its removal through the drain pipes is inefficient, the vehicle tire and/or track washing apparatus will have its operation suspended. Then the individual grates are pivoted upwardly such that each is in an elevated position past the vertical as shown in FIG. 6 of the drawings. In such position, it is now facile to gain access to the interior of the trough with mechanical equipment and, with or without all or almost all of the water drained from the bottom of the trough, such equipment can be utilized to remove accumulated mud and debris. It has been preferred to utilize water under pressure to wash such mud and debris along the bottom of the trough toward the nearest trough end, i.e., either the entrance or exit ramp, whereupon such equipment can easily enter the trough and removal can be effected mechanically rather than by hand as in other apparatus.

It will be apparent that many modifications and alterations can be made in the preferred embodiments of my invention shown hereinbefore without the use of any inventive skill. As to all such modifications and alterations that would be obvious to one of ordinary skill in this art, it is desired that they be included within the purview of my invention, which is to be limited only by the scope, including equivalents, of the following, appended claims.

What is claimed is:

1. A vehicle tire and track washing apparatus, comprising:

an elongated trough having transversely spaced side walls and a bottom, and terminating at one end in an inclined vehicle entrance ramp and at the other end in an inclined vehicle exit ramp, said ramps terminating outwardly of said trough substantially at or above ground level for access of vehicles to and from said trough, at least one of said side walls having a bearing surface, and pivot means is mounted on said bearing surface of said side wall; and an open-mesh grate connected at one end to said pivot means and at its other end extending outwardly away from said side wall, said open-mesh grate terminating at said outwardly extending end in support means to contact said trough bottom, such that when said grate is supported by said pivot means at said side wall bearing surface and at its outwardly extending end by said trough bottom, said grate will be in substantially horizontal position and overlie said bottom;

said grate being movable between said substantially horizontal position and a raised position in which said grate is pivoted upwardly away from said trough bottom and the free end of said grate does not overlie said trough bottom;

so that when said grate is pivoted upwardly so that it does not overlie said trough bottom, said bottom is substantially free of obstructions from trough structure, and accumulated debris from vehicles can be removed from the length of said trough toward said vehicle entrance or exit ramp without interference from trough structure extending longitudinally or transversely of said trough.

2. A vehicle tire and track washing apparatus as claimed in claim 1, in which said support means to contact said trough bottom includes a foot fixed to said outwardly extending grate end.

3. A vehicle tire and track washing apparatus as claimed in claim 2, in which one of said feet is fixed to said grate end at a corner thereof, said one foot having a grate supporting surface that extends beyond the periphery of said grate in the direction of the next adjoining grate.

4. A vehicle tire and track washing apparatus as claimed in claim 3, in which said grate supporting surface of said foot extends beneath a corner of said next adjoining grate to support two adjoining grates at adjacent corners when said grates are in substantially horizontal position.

5. A vehicle tire and track washing apparatus, comprising:

an elongated trough having transversely spaced side walls and a bottom, and terminating at one end in an inclined vehicle entrance ramp and at the other end in an inclined vehicle exit ramp, said ramps terminating outwardly of said trough substantially at or above ground level for access of vehicles to and from said trough, said side walls each having a bearing surface and pivot means mounted on each of said bearing surfaces; and opposed open-mesh grates connected at one end to each of said pivot means and at their other ends extending outwardly away from said side walls, said open-mesh grates terminating at said outwardly extending ends in support means to contact said trough bottom, such that when each of said opposed grates is supported by said pivot means at said one side wall bearing surface and at its said outwardly extending end by said support means to contact said trough bottom, said grates will be substantially coplanar and form a horizontal bearing surface;

said grates being movable between said substantially horizontal, coplanar position and a raised position in which each of said grates is pivoted upwardly away from said trough bottom and the free ends of said grates do not overlie said trough bottom;

so that when each of said grates is pivoted so that it does not overlie said trough bottom, said bottom is substantially free of obstructions from trough structure, and accumulated debris from vehicles can be removed from the length of said trough toward said vehicle entrance or exit ramp without interference from trough structure extending longitudinally or transversely of said trough.

6. A vehicle tire and track washing apparatus as claimed in claim 5, in which said support means to contact said trough bottom includes a foot fixed to said outwardly extending end of each of said grates.

7. A vehicle tire and track washing apparatus as claimed in claim 6, in which one of said feet is fixed to said grate end at a corner thereof, said one foot having a grate supporting surface that extends beyond the periphery of said grate in the direction of the next adjoining grate.

8. A vehicle tire and track washing apparatus as claimed in claim 7, in which said grate supporting surface of said foot extends beneath a corner of said next adjoining grate to support two adjoining grates at adjacent corners when said grates are in substantially horizontal position.

9. A vehicle tire and track washing apparatus as claimed in claim 5, in which is located below ground level and said vehicle entrance and exit ramps terminate outwardly of said trough at ground level.

10. A vehicle tire and track washing apparatus as claimed in claim 5, in which said opposed grates are supported in substantially horizontal position overlying said trough bottom with their ends laterally spaced from each other across the width of the trough in order to minimize the unsupported area of said grates between said side wall bearing surfaces and said outwardly extending ends of the grates.

11. A vehicle tire and track washing apparatus as claimed in claim 10, which the space between said laterally spaced grate ends is at least one-fourth of the width of said trough.

* * * * *